United States Patent [19]

Yoshimura et al.

[11] Patent Number: 5,060,769
[45] Date of Patent: Oct. 29, 1991

[54] SLIP CONTROL DEVICE OF A FLUID COUPLING

[75] Inventors: Hiroshi Yoshimura; Kenji Okamoto, both of Hiroshima, Japan

[73] Assignee: Mazda Motor Corporation, Hiroshima, Japan

[21] Appl. No.: 597,721

[22] Filed: Oct. 16, 1990

[30] Foreign Application Priority Data

Oct. 16, 1989 [JP] Japan .................. 1-269365

[51] Int. Cl.⁵ .................. B60K 41/28; F16H 45/02
[52] U.S. Cl. .................. 192/3.29; 192/0.052; 192/3.31; 74/890; 475/65
[58] Field of Search .................. 192/3.29, 3.31, 3.33, 192/0.052, 0.076, 52; 475/65; 74/890

[56] References Cited

U.S. PATENT DOCUMENTS

| | | | |
|---|---|---|---|
| 3,805,640 | 4/1974 | Schneider et al. | 192/3.31 X |
| 4,416,358 | 11/1983 | Kapp | 192/3.31 X |
| 4,539,869 | 9/1985 | Suga et al. | 74/890 X |
| 4,579,208 | 4/1986 | Nishikawa et al. | 192/0.076 |
| 4,633,985 | 1/1987 | Leorat | 192/0.055 |
| 4,781,279 | 11/1988 | Georg | 192/3.3 |
| 4,819,777 | 4/1989 | Yasue et al. | 192/0.062 |
| 4,940,122 | 7/1990 | Fujieda | 192/3.31 |
| 4,989,702 | 2/1991 | Yoshimura et al. | 192/3.31 X |
| 5,010,990 | 4/1991 | Yoshimura et al. | 192/3.31 X |

FOREIGN PATENT DOCUMENTS 60-256675 12/1985 Japan .
61-50179 11/1986 Japan .
63-67461 3/1988 Japan .

Primary Examiner—Allan D. Herrmann
Assistant Examiner—Andrea Pitts
Attorney, Agent, or Firm—Wenderoth, Lind & Ponack

[57] ABSTRACT

A slip control device of a fluid coupling is mounted in an automatic transmission of the type having a lockup clutch for directly coupling the input side and the output side of the fluid coupling to each other and a hydraulic control circuit for adjusting the locking force of the lockup clutch so as to make the slip of the lockup clutch controllable. The slip control device includes an electric control unit for controlling the hydraulic control circuit so that the locking force of the lockup clutch is set to a predetermined value intermediate between a value corresponding to a complete lockup condition and a value corresponding to a complete release condition during a predetermined period of time. Upon lapse of the predetermined period of time, the locking force of the lockup clutch is reduced temporarily and then increased gradually.

6 Claims, 5 Drawing Sheets

SLIP CONTROL DEVICE OF A FLUID COUPLING

BACKGROUND OF THE INVENTION

1. Field of the Invention

The present invention relates generally to an automatic transmission, and more particularly, to a slip control device of a fluid coupling provided in an automatic transmission.

2. Description of the Related Art

A torque converter (fluid coupling) of an automatic transmission as disclosed in Japanese Patent Publication (examined) No. 61-50179 is provided with a lockup clutch for directly coupling the input and output sides thereof to each other and a slip control device. The slip control device controls the locking force of the lockup clutch in a specified speed range in order to improve power transmission efficiency, while a torque increasing function and a torque fluctuation absorbing function are appropriately kept by the torque converter. Thus, the lockup clutch is allowed to be in a slip condition intermediate between a complete released condition and a complete locked condition. More specifically, the slip control device includes a slip control means for comparing a target amount of slip with the actual amount of slip corresponding to the difference between the number of rotations of the input side of the torque converter (engine speed) and the number of rotations of the output side thereof (turbine speed), thus performing feedback control of the locking force of the lockup clutch so that the actual amount of slip may approach the target amount of slip.

Furthermore, according to this disclosure, the turbine speed of the torque converter is indirectly detected on the basis of the speed of an output shaft of a transmission gear mechanism and a series of mating gears. When the turbine speed detected indirectly is used for a feedback control, the feedback control is stopped during the speed change to prevent an erroneous control caused by the difference between the indirectly detected turbine speed and the actual turbine speed. Accordingly, the locking force of the lockup clutch set immediately before a speed change order has been issued is maintained until the speed change is terminated.

However, during the speed changing operation, even though the locking force of the lockup clutch is maintained at a value detected immediately before the speed change is made, a shock due to the speed change cannot be sufficiently softened or the feeling of acceleration feeling is lowered because the locking force of the lockup clutch is too strong. More specifically, during a shiftup operation in which the locking condition of the friction elements of the transmission mechanism is switched according to a shifting order, the turbine speed is reduced. If the locking force of the lockup clutch is substantially the same as that detected before shifting is made, the engine speed is comparatively rapidly reduced with the reduction of the turbine speed, thereby producing a shock and a feeling of lowering of acceleration.

SUMMARY OF THE INVENTION

The present invention has been developed to overcome the above-described disadvantages.

It is accordingly an object of the present invention to provide a slip control device of a fluid coupling capable of appropriately adjusting the locking force of a lockup clutch during a shifting operation, thereby softening shocks and preventing a feeling of lower acceleration.

In accomplishing this and other objects, a slip control device according to the present invention is provided in a fluid coupling of an automatic transmission, which includes a lockup clutch for directly coupling the input side and the output side of the fluid coupling to each other and a locking force adjusting means for adjusting the locking force of the lockup clutch so as to make the slip of the lockup clutch controllable.

The slip control device comprises a shifting decision means for deciding the shifting of the automatic transmission and a locking force control means for controlling the locking force adjusting means, based on a decision of the shifting decision means, so that the locking force of the lockup clutch may be set to a predetermined value intermediate between a value corresponding to a complete lockup condition and a value corresponding to a complete release condition during a predetermined period of time from a point of start of shifting. Upon lapse of the predetermined period of time corresponding to the response delay in the shifting operation, the locking force of the lockup clutch is reduced temporarily and then increased gradually.

According to the above construction, upon lapse of the predetermined period of time, a feedforward control is performed to temporarily reduce the locking force of the lock-up clutch and gradually increase it. Therefore, the change of the engine speed is appropriately adjusted in compliance with the change of the turbine speed, thereby enhancing the function of absorbing a shock due to the speed change.

BRIEF DESCRIPTION OF THE DRAWINGS

This and other objects and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENT

Figure 1:
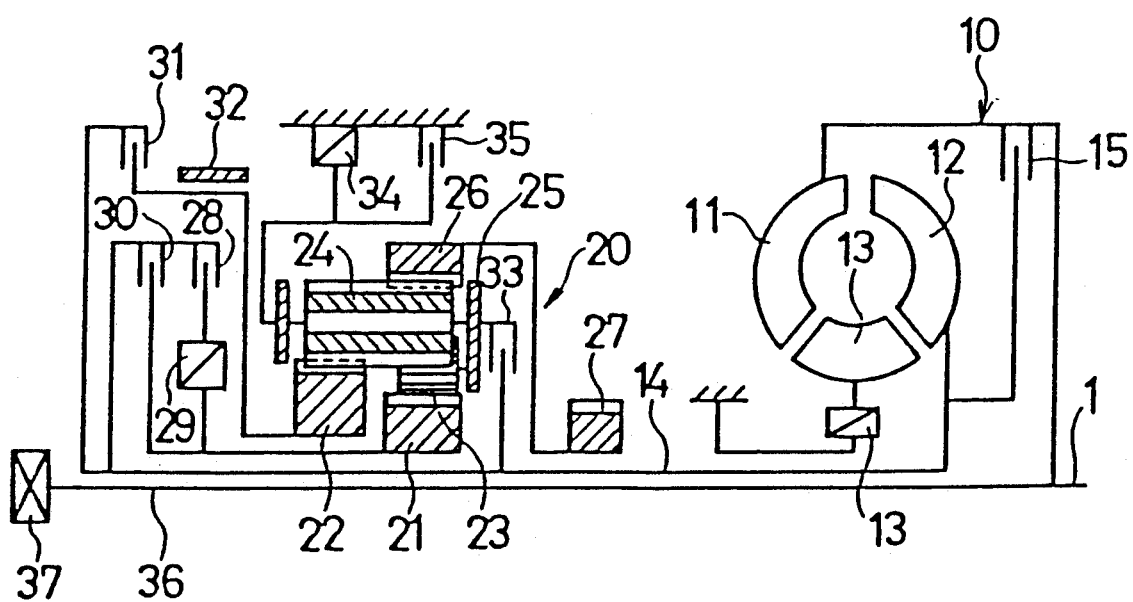
FIG. 1 is a schematic diagram showing an example of an automatic transmission to which a slip control device according to the present invention is applied.

Referring now to the drawings, there is schematically shown in FIG. 1 the construction of an automatic transmission to which a slip control device according to the present invention is applied. The automatic transmission comprises a torque converter 10 functioning as a fluid coupling and having connected to the output side thereof a transmission gear mechanism 20.

The torque converter 10 includes a pump 11 which rotates together with an engine output shaft 1, a turbine 12 driven by the rotation of the pump 11 through hydraulic oil, and a stator 13, interposed between the pump 11 and the turbine 12, for increasing the torque.

The rotation of the turbine 12 is transmitted to a turbine shaft 14. The torque converter 10 further includes a lockup clutch 15 for directly coupling the input side and output side thereof to each other. A detailed description of the construction of the above members will be provided below.

The transmission gear mechanism 20 comprises a RAVIGNEAUX type planetary gear unit. This transmission gear mechanism 20 includes a small sun gear 21 and a large sun gear 22 both mounted on the turbine shaft 14, a plurality of short pinion gears 23 and a plurality of long pinion gears 24 located at the peripheries of the sun gears 21 and 22, a carrier 25 rotatably supporting the pinion gears 23 and 24, a ring gear 26, and an output gear 27. Furthermore, a forward clutch 28, a first one-way clutch 29, a coast clutch 30, a reverse clutch 31, a 2-4 brake 32, a 3-4 clutch 33, a second one-way clutch 34, and a low reverse brake 35 are incorporated as friction elements for switching drive force transmitting paths. The supply of hydraulic oil to actuators for the friction elements is controlled according to the speed range and the driving condition (for example, the turbine speed and the opening of a throttle), thereby switching the friction elements so that the shifting operation may be automatically performed.

The engine output shaft 1 is coupled to a pump shaft 36 extending through the turbine shaft 14. The pump shaft 36 drives an oil pump 37 for supplying hydraulic oil to a hydraulic control circuit of the transmission.

Figure 2:
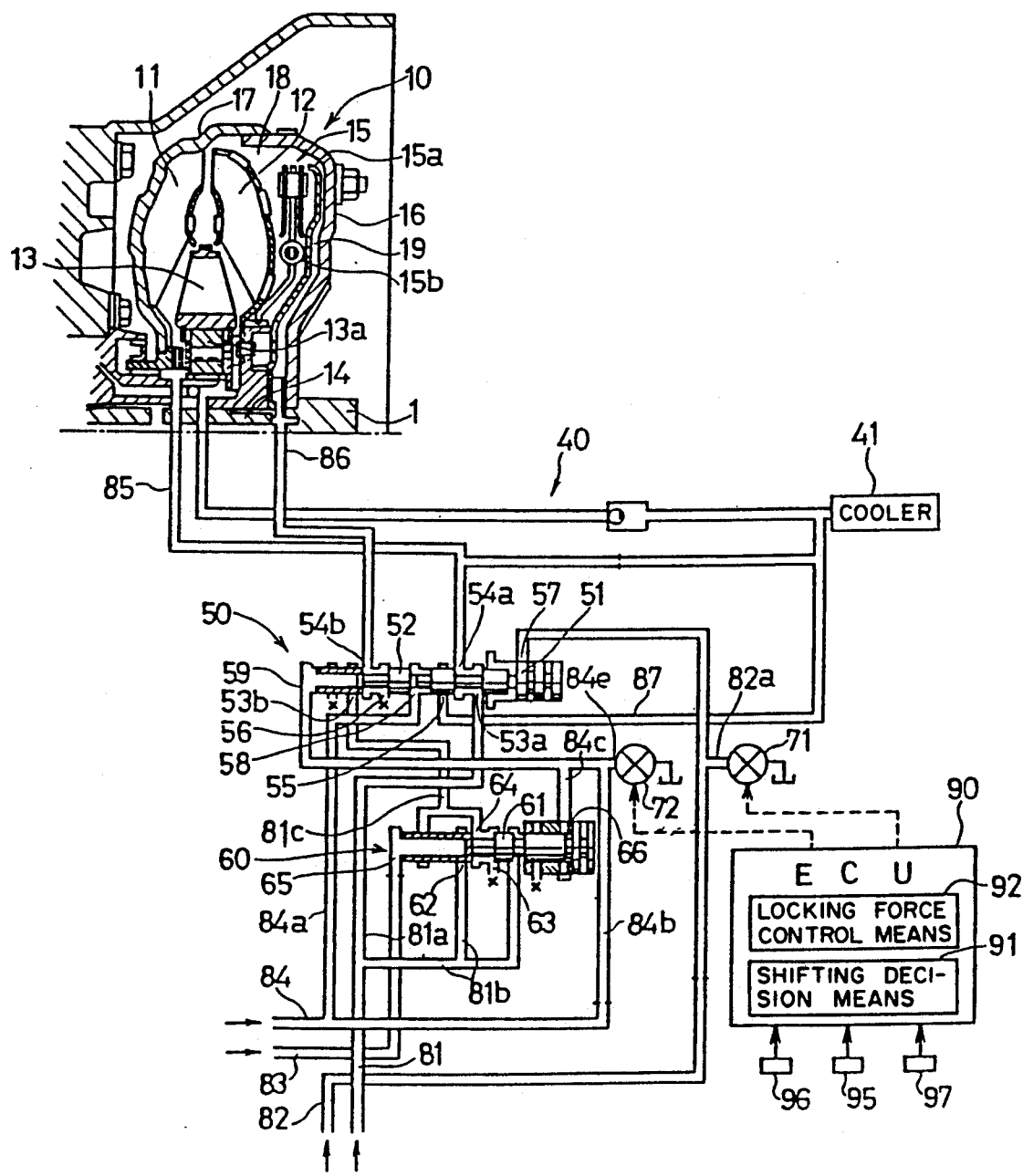
FIG. 2 is a diagram showing a hydraulic control circuit for controlling the slip control device according to the present invention.

FIG. 2 shows the detailed structure of the torque converter 10 including the lockup clutch 15 and the hydraulic control system connected thereto. The pump 11, the turbine 12, and the stator 13 are accommodated in a space defined by a front cover 16 connected to the engine output shaft 1, and a casing 17. The pump 11 is fixed to the casing 17 whereas the turbine 12 is coupled to the turbine shaft 14. The stator 13 is supported by a stationary frame through a one-way clutch 13a.

The lockup clutch 15 includes a damper 15b and a piston plate 15a having a friction facing opposed to the front cover 16. The piston plate 15a and the damper 15b rotate together with the turbine shaft 14. The piston plate 15a partitions the interior of the torque converter 10 into a locking chamber 18 formed on the side of the turbine 12 and a release chamber 19 formed on the side of the front cover 16, thus frictionally engaging the front cover 16 with a locking force according to the pressure difference between both the chambers 18 and 19.

A hydraulic control circuit 40 for controlling the lockup clutch 15 and a hydraulic control circuit (not shown) for controlling the friction elements of the transmission gear mechanism 20 are both included in the hydraulic control circuit of the whole entire automatic transmission. The hydraulic control circuit 40 functions as a means for adjusting the locking force of the lockup clutch 15 to control the slip of the lockup clutch. The hydraulic control circuit 40 includes a lockup shift valve (hereinafter referred to as a shift valve) 50, a lockup control valve (hereinafter referred to as a control valve) 60, a lockup solenoid valve (hereinafter referred to as a solenoid valve) 71, and a duty solenoid valve 72.

The shift valve 50 switches the hydraulic conditions between the locking chamber 18 and the release chamber 19 formed in the torque converter 10, and has spools 51 and 52 and a plurality of ports which will be described later. The control valve 60, which controls the pressure of the hydraulic oil to be supplied to the release chamber 19 through the shift valve 50, has a spool 61 and a plurality of ports which will be described later. The solenoid valve 71 performs the on-off control of a first pilot pressure to be supplied to the shift valve 50 whereas the duty solenoid valve 72 performs the duty control of a second pilot pressure to be supplied to the shift valve 50 and the control valve 60. Each of these valves communicates with at least one of the following hydraulic lines: a converter line 81 for supplying hydraulic oil discharged from the oil pump and appropriately adjusted to a predetermined line pressure; a first pilot line 82 for supplying a first pilot pressure; a throttle modulator line 83 for supplying a throttle modulator pressure adjusted according to the opening of a throttle mounted on the engine; a second pilot line 84 for supplying a second pilot pressure; and lines 85 and 86 communicating with the locking chamber 18 and the release chamber 19.

The torque converter line 81 branches to a line 81a connected to a port 53a of the shift valve 50 and a line 81b connected to a port 62 of the control valve 60. A port 64 capable of communicating with the port 62 and a drain port 63 is connected to a port 53b of the shift valve 50 through a line 81c. The line 85 communicating with the locking chamber 18 and the line 86 communicating with the release chamber 19 are connected to a port 54a and a port 54b of the shift valve 50, respectively. A line 87 communicating with a cooler 41 is connected to a port 55 of the shift valve 50. The port 54a selectively communicates with the port 53a or the port 55 according to the movement of the spool 51 whereas the port 54b selectively communicates with the port 53b or a drain port 56 according to the movement of the spool 52.

The first pilot line 82 is connected to a port 57, of the shift valve 50, positioned on the right side thereof through a stationary orifice as viewed in FIG. 2. A drain line 82a communicating with the line 82 is provided with the solenoid valve 71. When the solenoid valve 71 is turned on, the drain line 82a is opened.

The throttle modulator line 83 is connected to a port 65, of the control valve 60, positioned on the left side thereof as viewed in FIG. 2.

The second pilot line 84 branches to a line 84a and a line 84b. The line 84 is connected to a port 58 of the shift valve 50, positioned approximately at the center thereof, thus always applying a predetermined pressure between the spools 51 and 52. The line 84b is connected to a port 59 of the shift valve 50, positioned on the left side thereof through a stationary office. The line 84b is also connected to a port 66 of the control valve 60, positioned on the right side thereof through a line 84c. A drain line 84e communicating with the line 84b is provided with the duty solenoid valve 72. The amount of hydraulic oil to be drained from the drain line 84b varies according to the duty ratio (the ratio of the valve opening time to one periodic time). The amount of hydraulic oil to be drained from the drain line 84b increases in proportion to the increase of the duty ratio.

In the hydraulic control circuit 40, when the solenoid valve 71 is turned on and the duty ratio of the duty solenoid valve 72 is 0%, the pilot pressure being applied to the port 57 of the shift valve 50 is released while the second pilot pressure is applied to the port 59. As a result, the spools 51 and 52 of the shift valve 50 move rightward to a first position as shown in FIG. 2. In the first position, the port 54a communicates with the port 53a, with the result that the line pressure is supplied to the locking chamber 18 while the port 54b communicates with the drain port 56, with the result that the hydraulic oil in the release chamber 19 is drained. Consequently, the lockup clutch 15 is completely locked up. In contrast, when the solenoid valve 71 is turned off, the first pilot pressure is applied to the port 57 of the shift valve 50, with the result that the spools 51 and 52 of the shift valve 50 move leftward to a second position. In the second position, the port 54 communicates with the port 53b, with the result that the line pressure is supplied to the release chamber 19 while the port 54b communicates with the port 55, with the result that the hydraulic oil of the locking chamber 18 is drained. Consequently, the lockup clutch 15 is completely released.

Figure 3:
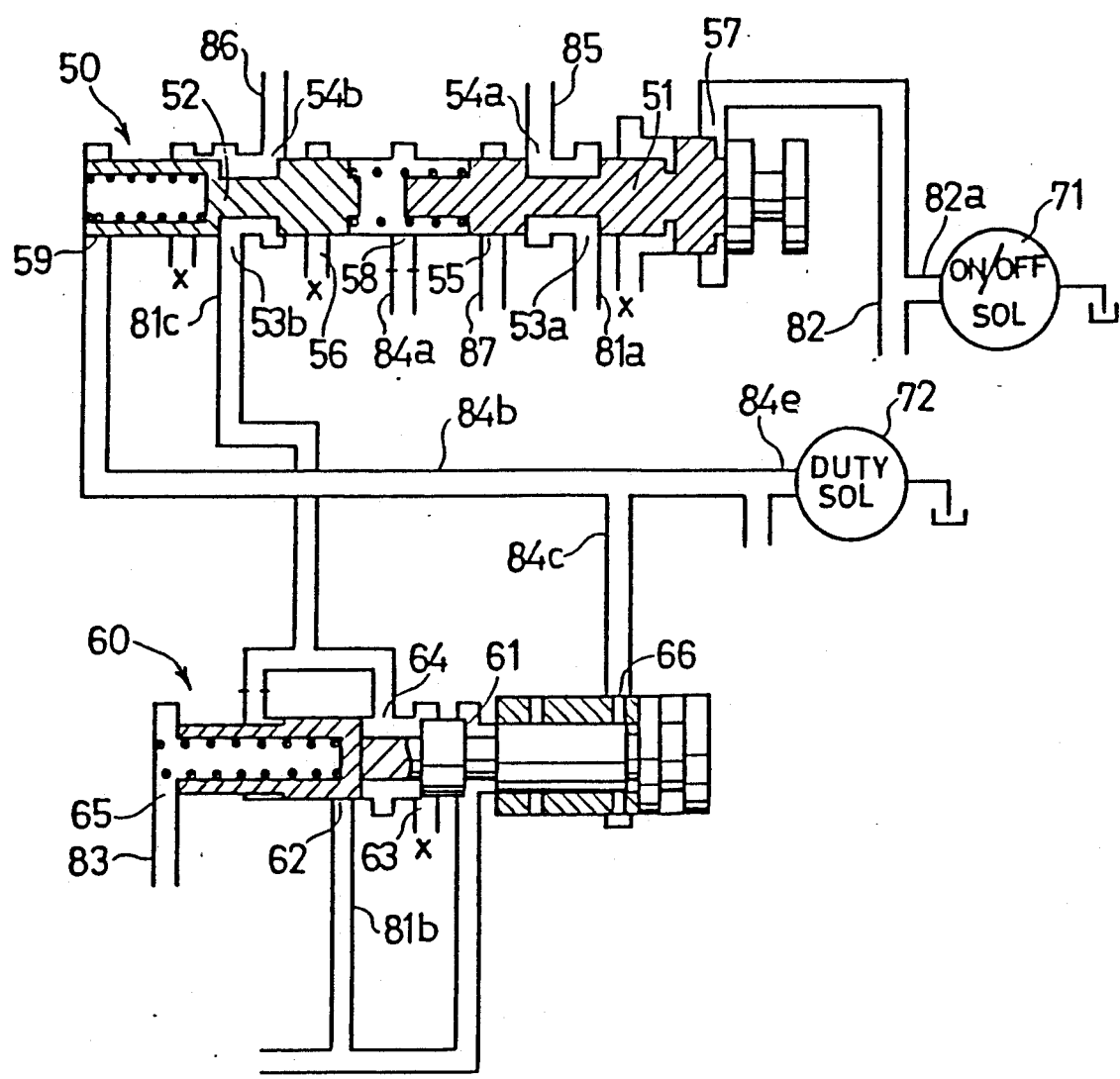
FIG. 3 is a diagram of the main portion of the hydraulic control circuit of FIG. 2.

When the solenoid valve 71 is turned on and the duty ratio of the duty solenoid valve 72 exceeds a predetermined value, for example 20%, the pilot pressures being applied to the ports 57 and 59 of the shift valve 50, positioned on both sides thereof, are reduced as shown in FIG. 3. As a result, the pilot pressure being applied to the space between the spools 51 and 52 causes the spools 51 and 52 to move rightward and leftward, respectively, to a third position. In the third position, the port 54a communicates with the port 53a, with the result that the line pressure is supplied to the locking chamber 18 while the port 54b communicates with the port 53b, with the result that the hydraulic pressure of the line 81c is supplied to the release chamber 19. At this time, the spool 61 of the control valve 60 moves according to the change of the second pilot pressure to be controlled by he duty ratio of the duty solenoid valve 72. As a result, the hydraulic pressure of the line 81c is adjusted and the pressure difference between the locking chamber 18 and release chamber 19 is adjusted. That is, the locking force of the lockup clutch 15 is controlled by the duty ratio of the duty solenoid valve 72. In this condition, when the duty ratio increases, the second pilot pressure is reduced and the spool 61 moves in the direction in which the hydraulic pressure of the release chamber 19 is reduced, namely, the direction in which the locking force of the lockup clutch 15 increases. Accordingly, the locking force of the lockup clutch 15 increases with the increase of the duty ratio.

An electric control unit (ECU) 90 shown in FIG. 2 controls the solenoid valve 71 and the duty solenoid valve 72. The control unit 90 outputs a signal to a shifting solenoid valve (not shown) incorporated in the hydraulic control circuit for controlling the friction elements of the transmission gear mechanism 20. In addition, the control unit ECU 90 outputs signals to both the solenoid valve 71 and the duty solenoid valve 72, thus controlling the lockup clutch 15. In a well known method for controlling a speed change, the control unit ECU 90 compares with a predetermined shifting pattern the driving conditions, which are checked by a signal transmitted thereto from a sensor 95 for detecting the turbine speed of the automatic transmission and a signal transmitted thereto from a sensor 96 for detecting the opening of a throttle mounted on the engine. When the speed change is needed, the shifting solenoid valve is controlled to switch the locking conditions of the friction elements of the transmission gear mechanism 20.

A basic method for controlling the lockup clutch 15 is as follows. In a speed range in which a torque increasing function and a torque changing function are required to the maximum, the lockup clutch 15 is completely released. In a speed range in which the torque increasing function and the torque changing function are not required, the lockup clutch 15 is completely locked up. In speed range other than the above two speed ranges, the lockup clutch 15 is controlled in a slip condition intermediate between the released condition and a lockup condition. In the slip control condition, the control unit 90 detects the speed difference (the amount of slip) between the turbine speed detected by a turbine speed sensor 95 and the engine speed detected by the engine speed sensor 97. Then, the control unit 90 compares the above difference with a predetermined target value. According to the comparison result, the duty ratio of the duty solenoid valve 72 is PI-controlled (proportional integral control), thereby feedback-controlling the locking force of the lockup clutch 15 so that the aforementioned speed difference may approach the target value.

The control unit 90 includes a locking force control means 92 for controlling the locking force of the lockup clutch 15 on the basis of the decision made by a shifting decision means 91 during the shifting. When a predetermined shifting is carried out, the locking force control means 92 controls the hydraulic control circuit 40 so that the valves thereof are positioned as shown in FIG. 3. The locking force control means 92 also controls the duty ratio of the duty solenoid valve 72 so as to control the locking force of the lockup clutch 15. To this end, the locking force control means 92 performs a feed forward control. More specifically, the locking force of the lockup clutch 15 is set to a predetermined value intermediate between a value corresponding to the completely released condition and a value corresponding to the lockup condition during a predetermined period of time, which corresponds to a response delay period from a start point of shifting at which a shifting signal is output until a point when the friction elements of the transmission gear mechanism actually start switching. The locking force control means 92 when reduces the locking force of the locking clutch 15 when the predetermined period of time elapses and thereafter increases it gradually.

Figure 4:
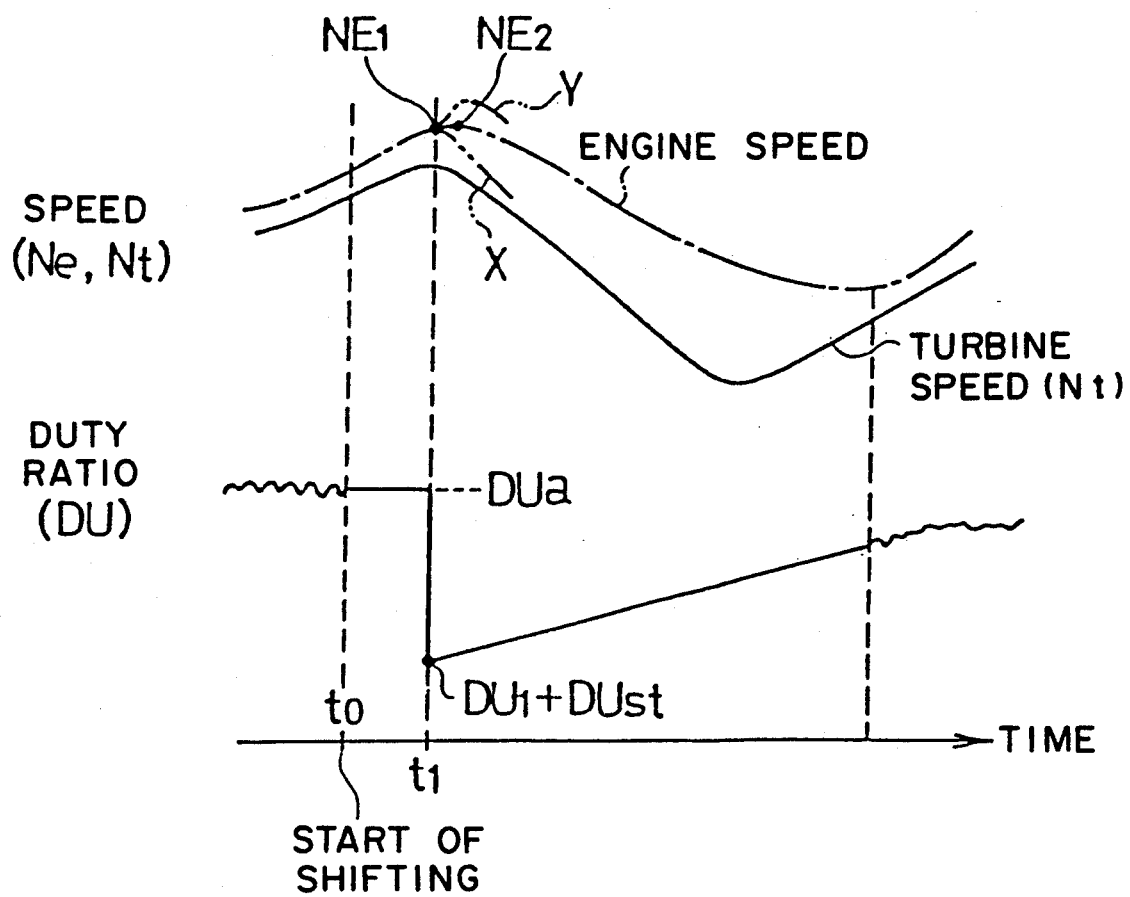
FIG. 4 is a time chart showing the control operation of the slip control device.

An example of the control to be made by the locking force control means 92 during shifting is described briefly with reference to a time chart shown in FIG. 4. In this embodiment, the locking force of the lockup clutch 15 is controlled when the shift-up operation is carried out under the conditions in which the amount of slip is feedback-controlled. In this control, after a first point t0 at which a shifting order is given, a second point t1 is examined, from which the turbine speed starts reducing due to the change-over of the friction elements of the transmission gear mechanism 20 and at which the actual shifting is started. The duty ratio DU of the duty solenoid valve 72 is kept to be a value DUa detected immediately before the execution of the shifting until the second point t1. At this point t1, the duty ratio DU is set to (DU1+DUst), which is discussed later and is much smaller than the value DUa. Thereafter, the duty ratio DU is gradually increased by a constant amount.

Figure 5:
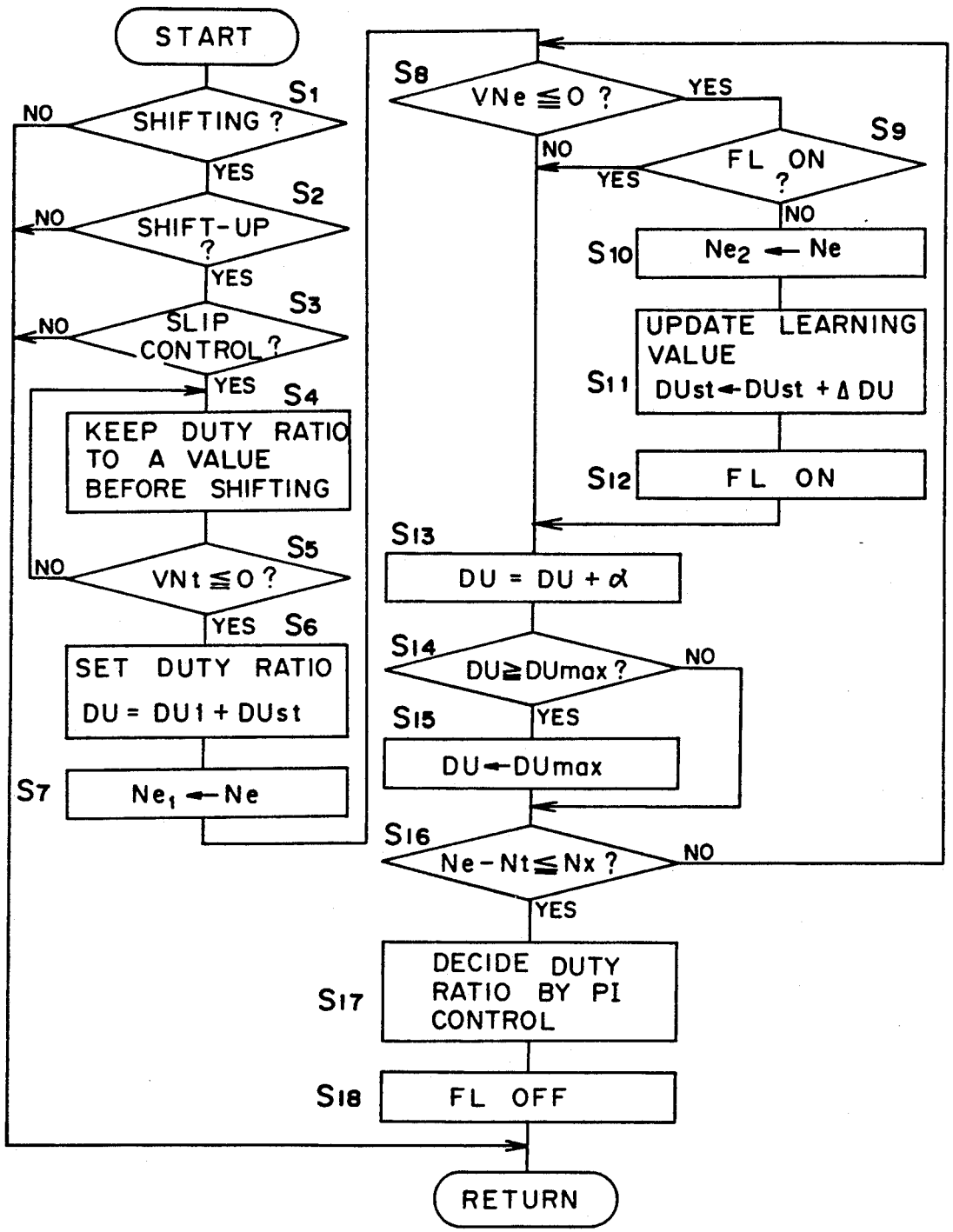
FIG. 5 is a flowchart showing the control procedure during the shifting operation.

The above control is described in more detail with reference to a flow chart shown in FIG. 5. In this flowchart, only the control with respect to the lockup clutch 15 is shown when a shift-up operation is effected under the conditions in which slip control is being carried out. The control for the lockup clutch 15 and that for the friction elements of the transmission gear mechanism 20 at the time except the above are omitted.

First, it is decided at step S1 on the basis of the driving conditions whether or not shifting is being carried out. If the shifting is being carried out, the procedure proceeds to step S2 at which it is decided whether or not the shifting is a shift-up operation. If a shift-up operation is being carried out, it is checked at step S3 whether or not the control for the lockup clutch 15 until then has been in the slip control condition. If YES, the procedure after step S4 is executed during the shift-up operation under the slip control condition.

At the steps S4 and S5, the duty ratio DU of the duty solenoid valve 72 is kept to be a value DUa detected immediately before the execution of a shifting until an amount of change VNt (the difference between a current value and a previous value) of the turbine speed Nt obtained based on a signal from the turbine speed sensor 95 becomes [VNt≦0].

When [VNt≦0], namely, at the second point $t_1$ at which the turbine speed start reducing with the initiation of the switching of the friction elements of the transmission gear mechanism 20, the duty ratio DU is set as the initial value of the feedforward control at step S6. The duty ratio DU to be set at this time is rendered to be much smaller than the value DUa set until then as shown in FIG. 4. In order to make the duty ratio DU appropriate at this point, the predetermined basic value DU1 is read from a map according to the type of speed change, for example, from 2-speed to 3-speed and from 2-speed or 3-speed to 4-speed, and a learning value, DUst updated by a learning processing which will be described later and stored in a learning map, is read out so that a value obtained by adding the learning value DUst to the basic value DU1 is set as the duty ratio DU. At step S7, the engine speed Ne obtained at this point is stored as Ne1. Then, the procedure proceeds to step S8.

It is decided at step S8 whether or not an amount of change VNe (the difference between the current value and the previous value) of the engine speed Ne obtained based on a signal from the engine speed sensor 97 has become [VNe≦0]. If YES, it is checked at step S9 whether or not a second flag F2 is on. At steps S8 and S9, a point when the engine speed starts reducing, i.e. the point when the engine speed becomes maximum, is detected. If the decision at step S8 is YES and the decision at step S9 is NO, it is decided that the engine speed is maximum. Then, the procedure proceeds to step S10 through step S12 at which the learning processing is carried out. Thereafter, the procedure proceeds to step S13 through step S15. If the decision at step S8 is NO or the decision at step S9 is YES, the procedure directly proceeds to step S13 through step S15.

The learning processing executed at steps S10 through S12 updates the learning value DUst of the duty ratio DU at the second point $t_1$ so as to avoid rapid increase of the engine speed or the like. More specifically, at step S10, the engine speed Ne is stored as a maximum value Ne2. At step S11, a rectified value ΔDU of the learning value according to the difference between the maximum value Ne2 and the engine speed Ne1 at the second point $t_1$ is retrieved by the map and the learning value DUst of the duty ratio stored in the learning map is updated to a value obtained by changing the learning value DUst by the rectified value ΔDU. The rectified value ΔDU corresponding to the difference (Ne2−Ne1) is stored in advance as a map so that the rectified value ΔDU is a positive value if the difference (Ne2−Ne1) is greater than an appropriate value and the rectified value ΔdU is a negative value if the difference (Ne2−Ne1) is smaller than the appropriate value. The learning value DUst is updated based on the map. After a slip flag is turned on at step s12, the procedure proceeds to step S13 through step S15.

At step S13 through step S15, the duty ratio DU is increased by a small constant value α. If it is decided at step S14 that the duty ratio DU exceeds a predetermined maximum value DUmax, the maximum value DUmax is set as the duty ratio DU at step S15. It is decided at step S16 whether or not the difference between the current engine speed Ne and the current turbine speed Nt becomes smaller than a predetermined value $N_x$. The program repeats steps from S8 to S16 until the difference (Ne−Nt) becomes smaller than the predetermined value $N_x$.

It is decided at step S16 that the difference (Ne−Nt) is smaller than the predetermined value Nx, the duty ratio DU is decided by a PI control corresponding to the above speed difference at step S17. That is, the feedback control is carried out to make this speed difference approach a predetermined target value set in advance. Then, the flag FL is rendered to be off at step S18 and the procedure returns.

According to the above-described embodiment, during the period of time corresponding to the response delay from the first point $t_0$ until the second point $t_1$, the duty ratio DU of the duty solenoid valve 72 is kept to be the value detected immediately before the shifting is started. Therefore, the locking force of the lockup clutch 15 is kept to be approximately equal to that during the feedback control operation which has been performed prior to the shifting operation.

From the second point $t_1$ at which the friction elements of the transmission gear mechanism start to switch, the duty ratio DU is set to a value (DU1+DUst) smaller than the previous value DUa so as to reduce the locking force of the lockup clutch 15. Then, the duty ratio DU is gradually increased by the small constant value α from the termination of shifting until the difference between the engine speed Ne and the turbine speed Nt becomes smaller than the predetermined value Nx. As a result, the locking force of the lockup clutch 15 is gradually increased. The change of the engine speed during the shifting operation is appropriately adjusted according to feedforward control as shown by a single dotted chain line in FIG. 4.

In other words, the turbine speed starts reducing with the shifting operation from the second point $t_1$ as shown by a solid line in FIG. 4. Conventionally, the engine speed is reduced comparatively rapidly with the reduction of the turbine speed as shown by a double dotted chain line X if the locking force of the lockup clutch 15 is left to be substantially the same as that before the shifting. In contrast, according to the present invention, the engine speed is gradually reduced because the locking force of the lockup clutch 15 is reduced at the second point $t_1$. In this case, the duty ratio DU at this point $t_1$ is adjusted by the learning value DUst, which is further updated according to the difference between the maximum engine speed Ne2 and the engine speed Ne1 at the second point $t_1$. Thus, the locking force of the lockup clutch 15 is prevented from being too small, thereby preventing the engine speed from rapidly increasing as shown by a double dotted chain line Y in FIG. 4. Thereafter, the locking force of the lockup clutch 15 is gradually increased and the engine speed Ne is smoothly changed to an appropriate speed after shifting.

In the above-described embodiment, although the locking force of the lockup clutch 15 is controlled during the shift-up operation, a similar control may be carried out during the shift-down operation to minimize a shock due to an unavoidable increase of the engine speed. Even the shifting from a speed range other than the speed range in which the slip control is carried out, the feedforward control as described previously may be carried out from the second point by maintaining the locking force of the lockup clutch 15 to a predetermined value until the second point.

As is apparent from the foregoing description, in the apparatus which enables the slip control of the lockup clutch mounted in the fluid coupling of the automatic transmission, the locking force of the lockup clutch is set to a predetermined value intermediate between the completely released condition and the lockup condition during a predetermined period of time after a shifting if started. Upon lapse of a predetermined period of time, the locking force is temporarily reduced and then gradually increased. Accordingly, when the turbine speed changes with the shifting operation, the engine speed is not rapidly reduced, but can be smoothly changed, thereby softening the shock during a shifting and preventing the feeling of acceleration being lowered.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. In a fluid coupling mounted in an automatic transmission having a lockup clutch for directly coupling an input side and an output side of the fluid coupling to each other and a locking force adjusting means for adjusting a locking force of the lockup clutch so as to enable slip of the lockup clutch to be controllable;

a fluid coupling including a slip control device comprising:

said automatic transmission; and a locking force control means for controlling said locking force adjusting means, based on a decision of said shifting decision means, so that the locking force of said lockup clutch is set to a predetermined value intermediate between a value corresponding to a complete lockup condition and a value corresponding to a complete release condition during a predetermined period of time from start point of shifting, and upon lapse of said predetermined period of time, the locking force of said lockup clutch is reduced temporarily and then increased gradually.

2. The slip control device according to claim 1, wherein a feedforward control is performed by said locking force control means.

3. The slip control device according to claim 1, wherein the control is performed during a shift-up operation.

4. The slip control device according to claim 1 wherein said locking force adjusting means comprises a hydraulic control unit having a duty solenoid valve mounted therein, said locking force adjusting means adjusting the locking force of said lockup clutch in response to a signal from said locking force control means, which controls a duty ratio of said duty solenoid valve.

5. The slip control device according to claim 1, wherein the locking force of said lockup clutch is gradually increased until the difference between an engine speed and a turbine speed becomes smaller than a predetermined value.

6. The slip control device according to claim 1, wherein the locking force of said lockup clutch is temporarily reduced when the turbine speed starts reducing.

* * * * *